United States Patent [19]

Orszullok

[11] 4,258,444
[45] Mar. 31, 1981

[54] BATH WATER LEVEL CONTROL SYSTEM

[75] Inventor: Willy Orszullok, Altena, Fed. Rep. of Germany

[73] Assignee: Friedrich Grohe Armaturenfabrik GmbH & Co., Hemer, Fed. Rep. of Germany

[21] Appl. No.: 37,413

[22] Filed: May 9, 1979

[30] Foreign Application Priority Data

May 11, 1978 [DE] Fed. Rep. of Germany ....... 2820504

[51] Int. Cl.³ ..................... A47K 3/00; G01F 23/26; F16K 21/18
[52] U.S. Cl. ........................................ 4/538; 4/191; 4/205; 4/427; 4/661; 73/304 C; 137/392; 340/562; 340/616
[58] Field of Search .................. 4/166, 173 R, 187 R, 4/198–202, 205, 427, DIG. 3, 538, 541, 545, 619, 620, 623, 191, 206, 661; 137/392, 588; 340/562, 616, 618, 625, 630, 624; 73/290 V, 304 C

[56] References Cited

U.S. PATENT DOCUMENTS

| 267,156 | 11/1882 | Cooper | 4/202 X |
|---|---|---|---|
| 1,692,512 | 11/1928 | Mueller et al. | 4/202 |
| 1,956,086 | 4/1934 | Tracy | 4/427 |
| 2,268,819 | 1/1942 | Groeniger | 4/199 |
| 2,537,028 | 1/1951 | Cahusac et al. | 340/630 X |
| 2,907,994 | 10/1959 | Harke | 340/624 |
| 3,019,650 | 2/1962 | Worswick | 73/290 V |
| 3,916,926 | 11/1975 | Smolin et al. | 137/392 X |
| 4,041,557 | 8/1977 | Ringler | 4/427 |
| 4,042,984 | 8/1977 | Butler | 4/200 |
| 4,173,755 | 11/1979 | Butler | 340/562 |

FOREIGN PATENT DOCUMENTS

| 304412 | 6/1913 | Fed. Rep. of Germany | 4/205 |
|---|---|---|---|
| 1609195 | 12/1969 | Fed. Rep. of Germany | 340/616 |
| 320752 | 10/1929 | United Kingdom | 4/205 |

Primary Examiner—Stuart S. Levy
Attorney, Agent, or Firm—James B. Raden; Donald J. Lenkszus

[57] ABSTRACT

A water level control system for use with bath tubs includes a capacitive proximity switch disposed external to one wall of the bath tub. The vertical position of the switch is adjustable. The switch generates a signal when the water level is approximately that of the switch. The signal is used to control a water supply solenoid and/or an alarm indication.

4 Claims, 2 Drawing Figures

BATH WATER LEVEL CONTROL SYSTEM

BACKGROUND OF THE INVENTION

1. Field of the Invention

This invention pertains to a water level control system for bath tubs or similar apparatus.

2. Description of the Prior Art

The purpose of level control systems is to preselect with precision the water level in bath tubs or similar appliances and to monitor the filling process.

Devices of this nature are known. However, such devices have the inherent disadvantage that they are positioned in the area filled by the bath water and thus, restrict the room for movement of the person bathing. Moreover, these known devices are highly complicated in their structure and, consequently, relatively expensive to buy and also very often present an unaesthetic appearance in the bathroom.

The invention is based upon the need to create a water level control system which can be located completely outside the area filled by the bath water and in no way restricts the room for movement of the person bathing.

SUMMARY OF THE INVENTION

A water level control system in accordance with the principles of the invention includes a probe or detecting means disposed exterior to one wall of a bath tub and being vertically adjustable. The probe emits a signal when the level of water approximately reaches a predetermined level. The signal is used to actuate a device to turn off the inflowing water and/or to trip an alarm device.

In one embodiment of the invention, at least a portion of the bath tub wall in the vicinity of the probe is constructed of a non-conductive material and the probe includes a capacitive proximity switch which emits a switching pulse when the water level rises to within the measuring range of the switch. A solenoid valve, responsive to the switching pulse, shuts off the inflowing water supply.

Further in accordance with the principles of the invention, the probe may be secured to a holding device whereby the probe is vertically adjustable.

The entire water level control system can be mounted in covered manner, e.g. between the shell of the bath tub and the tile screen in the area of the drain and overflow fittings. The level preselector device can be integrated in a cover rosette for the overflow aperture of the bath tub.

Still further in accordance with the invention, the device can be linked up to a faucet for the supply of mixed water, powered by auxiliary energy, whereby all the control elements can be arranged in concentrated manner in a position which offers ready accessibility.

BRIEF DESCRIPTION OF THE DRAWING:

The invention may be better understood from a reading of the following detailed description in conjunction with the drawing in which.

Figure 1:
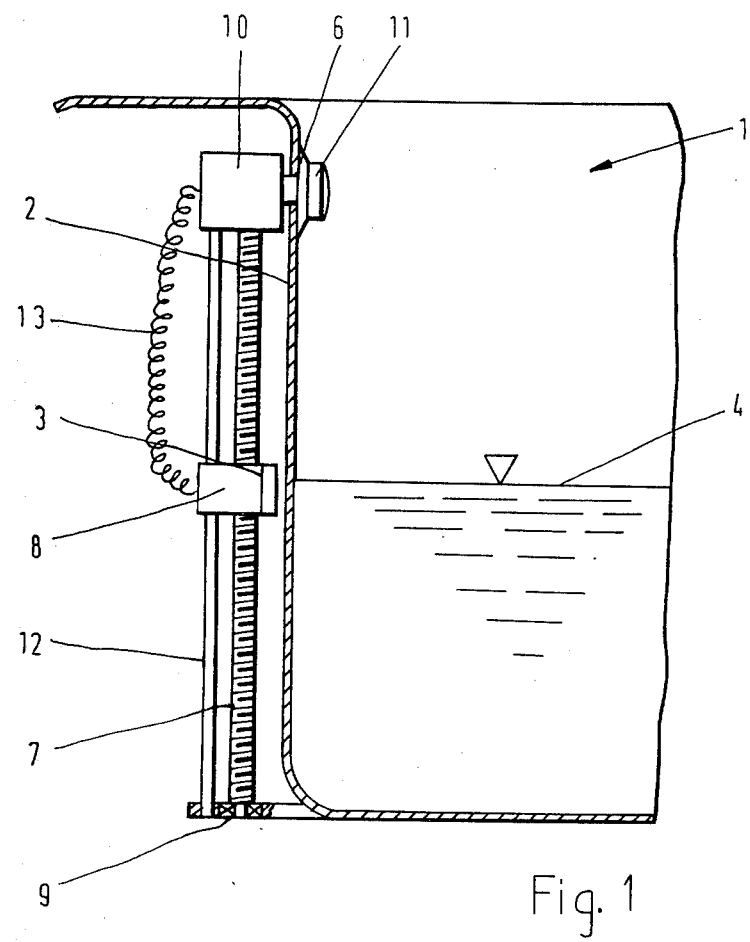
FIG. 1 shows a part of a bath tub with a water level control system in accordance with the principles of the invention.
Figure 2:
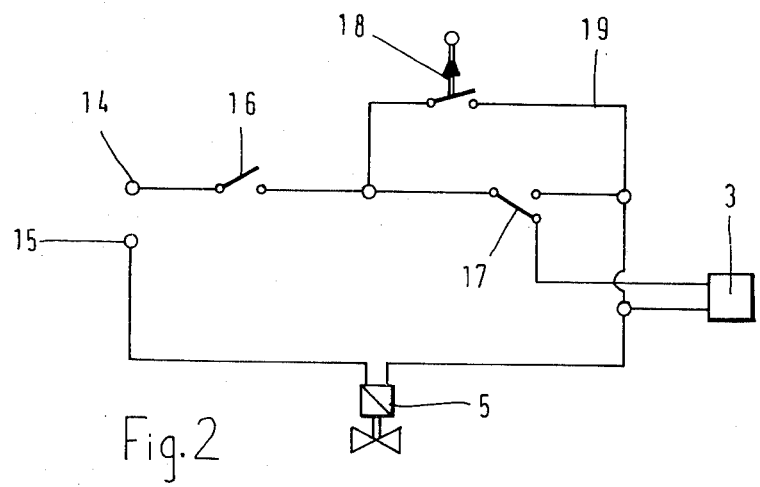
FIG. 2 shows an electric circuit for the water level control system.

DETAILED DESCRIPTION OF THE DRAWING:

A water level control system is arranged on the end wall 2 at the bottom end of a bath tub 1 made of plastic material in the region of an overflow device which is not shown here. A gear 10 is secured to the bath tub in the vicinity of the overflow aperture with a knob 11 to preselect the water level. A threaded spindle 7, a nut 8 with a probe 3 to locate the water level and a guide rod 12 as well as a mounting 9 are also secured to the bath tub. The probe 3 is in the form of a capacitive proximity switch and is connected via a connecting cable 13 to an electric switch as shown in FIG. 2. A solenoid valve 5 is interposed between the water lines 20 and mixer valve 21 to regulate the inflow of water into the bath tub. A power source is connected to the terminals 14 and 15 in the circuit diagram shown. If the switch 16 is now actuated, the circuit is closed and the solenoid valve 5 is opened and the water flows into the bath tub. The filling process is maintained until the water level 4 enters into the measuring range of probe 3. The capacitive proximity switch in the probe then interrupts the circuit whereafter the solenoid valve 5 shuts off the inflow of water and concludes the filling process.

Optionally, the water level control system can be taken out of operation by means of the switch 17 so that the bath tub can then be filled without limit. In addition, a bypass 19 is provided with a momentary-contact switch 18 by means of which the water level control system can be bypassed by pushbutton and supplementary filling can take place.

To obtain any water level desired, the threaded spindle 7 can be turned by means of the knob 11 via the gear 10 and thus, reset the probe to the required level. To this end, the knob 11 is arranged to good advantage coaxially in a cover rosette 6 of an overflow aperture of the bath tub whereby a scale showing the filling level can be provided on the cover rosette.

Naturally, other setting devices can be provided such as, for example, an electric motor which imparts the required rotation to the spindle by pushbutton action whereby the position of the probe 3 then has to be indicated separately.

The probe itself can also be provided in the form of a vertical row of sensors arranged on the end wall of the bath tub whereby, depending upon the filling level selected, one sensor is actuated by means of the selector device and actuates the inflow control system.

What is claimed is:

1. A water level control system for a bath tub comprising:
    vertically adjustable detecting means disposed exterior to one wall of said tub for generating a signal when the water in said tub reaches a level at approximately the level of said detecting means;
    means for vertically positioning said detecting means, said positioning means including means for holding said detecting means and for translating movement of said level selecting means into a corresponding vertical movement of said detecting means, said holding means comprising a threaded spindle rotatably mounted adjacent said one wall of said tub and a nut supported on said spindle, said nut being nonrotatably connected to said detecting means;
    said bathtub including an overflow aperture and a cover rosette;
    said system further comprising:

level selecting means comprising a knob movable on said rosette, gearing means coupling said knob to said spindle, means for mounting said spindle to permit rotational movement thereof; and means responsive to said generated signal for shutting off the inflowing water supply.

2. A water level control system in accordance with claim 1, wherein said means responsive to said generated signal includes means for producing an alarm indication.

3. A water level control system for a bath tub comprising:

vertically adjustable detecting means disposed exterior to one wall of said tub for generating a signal when the water in said tub reaches a level at approximately the level of said detecting means;

means for vertically positioning said detecting means, said positioning means including means for holding said detecting means and for translating movement of said level selecting means into a corresponding vertical movement of said detecting means, said holding means comprising a threaded spindle rotatably mounted adjacent said one wall of said tub and a nut supported on said spindle, said nut being nonrotatably connected to said detecting means;

said bathtub including an overflow aperture and a cover rosette;

said system further comprising:

level selecting means comprising a knob movable on said rosette, gearing means coupling said knob to said spindle, means for mounting said spindle to permit rotational movement thereof; and means responsive to said generated signal for producing an alarm indication.

4. A water level control system in accordance with claim 1 or 3, wherein at least said one wall comprises a portion of non-conductive material;

said detecting means comprises a capacitive proximity switch; and said responsive means comprises a solenoid valve for controlling the flow of water.

* * * * *